United States Patent [19]

Matsuura et al.

[11] Patent Number: 4,604,861
[45] Date of Patent: Aug. 12, 1986

[54] METHOD AND APPARATUS FOR STRANDING PROFILE STRANDS

[75] Inventors: Takayuki Matsuura; Kenji Miyazaki, both of Osaka, Japan

[73] Assignee: Sumitomo Electric Industries, Ltd., Osaka, Japan

[21] Appl. No.: 682,652

[22] Filed: Dec. 17, 1984

[30] Foreign Application Priority Data

Dec. 26, 1983 [JP] Japan .................. 58-248942

[51] Int. Cl.⁴ .................. D07B 5/10; D07B 3/00; D07B 7/00
[52] U.S. Cl. .................. 57/9; 57/311
[58] Field of Search .................. 57/6, 9, 138, 215, 311, 57/3, 12, 13, 33, 282, 290, 309

[56] References Cited

U.S. PATENT DOCUMENTS

| | | | |
|---|---|---|---|
| 1,808,444 | 6/1931 | Zapf | 57/9 |
| 1,996,689 | 4/1935 | Rohs | 57/311 |
| 4,009,561 | 3/1977 | Young | 57/6 |
| 4,064,685 | 12/1977 | Polke | 57/9 X |
| 4,497,164 | 2/1985 | Dotti | 57/9 X |
| 4,530,205 | 7/1985 | Seiler et al. | 57/311 X |

Primary Examiner—Donald Watkins
Attorney, Agent, or Firm—W. G. Fasse; D. H. Kane, Jr.

[57] ABSTRACT

A plurality of strands (7) of sectorial cross-section is stranded around a central core such as an optical fiber conductor. First, a rigid type stranding machine is used to impart a spiral twist to each strand (7). Then, the twisted strand (7) is heat-treated or otherwise treated to remove any stress caused by the twisting. These strands are then fed to a planetary type stranding machine which provides a planetary motion in which the strands perform an orbital rotation around the optical fiber core of an optical conductor or conductors without rotation about its own axis, whereby the strands are stranded together on the optical fiber core.

29 Claims, 18 Drawing Figures

METHOD AND APPARATUS FOR STRANDING PROFILE STRANDS

BACKGROUND OF THE INVENTION

This invention relates to a method and apparatus for stranding profile strands. The products obtained by the method and apparatus of this invention typically include composite aerial wires such as aerial ground wires and aerial transmission wires, but they also include stranded wires such as ropes. In addition, this invention is advantageous particularly when applied to an optical composite aerial ground wire having an optical transmission function.

For example, an aerial ground wire which has been used conventionally is formed of an aluminum covered steel wire and/or aluminum alloy wire of circular cross-section, and comprises a single central wire and several, e.g., 6 strands twisted around the central wire. Recently, however, with the spread of optical transmission, an attempt has been made to make efficient use of an aerial ground wire by providing such a wire with an optical transmission function.

Such aerial ground wire having an optical transmission function uses an optical fiber conductor or conductors as the central wire material. There are various types of optical fiber conductors, but most of these conventional optical conductors comprise a pipe of aluminum or its alloy which receives an optical fiber core of one or more optical fibers. Although each optical fiber forms an optical conductor, several such fibers forming a core may still be referred to as an optical conductor.

However, the tensile strength of an optical fiber conductor is not so high as that of an ordinary wire. Thus, the use of an optical fiber in a conductor results in a decrease in the strength of the aerial ground wire as a whole. To obtain the strength necessary for an aerial ground wire, one could increase the diameter of strands to be used. If, however, such procedure is simply put to practice, the apparent diameter of the aerial ground wire in its entirety increases and hence the wire is liable to receive an increased wind pressure; thus, from the standpoint of use of an aerial ground wire, the result is not so desirable.

As a method of increasing the cross-sectional area and the strength of each strand while decreasing the outer diameter of the entire aerial ground wire, the following suggestion has been made: the cross-section of strands to be stranded or twisted together to form an optical fiber conductor should be made substantially a sector so that the outer surface of the aerial ground wire obtained is substantially a cylindrical surface. The sector referred to herein is a shape which is obtained when an area defined between two concentric circles is cut by radially extending lines. If a stranded wire is formed of strands each having such cross-sectional shape, not only is the tensile strength increased without increasing the outer diameter of the stranded wire so much, but also there is obtained a concomitant effect that the ambient pressure on the optical fiber conductor passing through the center is relieved by the bridge effect of the strands forming the stranded wire layer.

However, profile strands having the mentioned sector cross-section encounter some problems during stranding. The conventional stranding methods are roughly classified into two types. One first type stranding is the so-called "untwisted" type. The stranding machines for this first type of stranding include a "planetary type stranding machine", a "tubular type stranding machine" and a "take-up rotary type stranding machine having an untwisting function". The second stranding type is the so-called "non-untwisting" type. The stranding machines for this type of stranding include the "rigid type stranding machine" and the "take-up rotary type stranding machine having no untwisting function".

In the "untwisted" type, e.g., in a planetary type stranding machine where the cage is rotated, bobbins for supplying strands are caused to perform a planetary motion around the central wire material while maintaining their axes directed in a fixed direction. Therefore, the strands will be spirally wound around the central wire material while their inclined attitudes on the cross-sections of the strands to be stranded together around the central wire material are maintained constant. If the cross-section of the strands is circular, even the use of this type of stranding makes it possible to arrange the strands regularly around the outer peripheral surface of the central wire material, but in the case of profile strands having a profile cross-section such as a sector, this "untwisted" type cannot be simply used.

In contrast thereto, with the "non-untwisted" type of stranding, said profile strands can be stranded together in a state in which they are in close surface contact with the outer peripheral surface of the central wire material. However, the strands stranded together by this type will have large stresses remaining therein, and unless these stresses are removed, it is impossible to obtain a stranded wire having a satisfactory performance. That is, what is required of a stranded wire are freedom from the "loosening" of the strands, freedom from the rotation (untwisting) of the entire stranded wire, and freedom from the "undulation" of the stranded wire, means that the stranded wire should be straight as a whole. However, where stranding is performed by the "non-untwisted" type, the aforesaid requirements for stranded wires cannot be met due to residual stresses in the strands. For this reason, where stranding is performed by the "non-untwisted" type, it has been a usual practice to pass the stranded wire through a post-forming step subsequent to the stranding or twisting step so as to remove the residual stresses in the strands. This post-forming step is performed by post-forming rollers externally pressing the stranded wire.

Even if this post-forming step is performed, this does not necessarily mean that all the problems caused by the "non-untwisted" type can be solved. First, in the case of a stranded wire of high tensile strength, such as is formed of steel strands, the residual stresses cannot be completely removed by a mere post-forming step. Particularly in the case of a stranded wire forming the aforesaid optical fiber conductor and using a central wire material, the optical fibers can be damaged by this post-forming step. That is, the pressure applied by the post-forming step can deform the pipe which forms the outer periphery of the optical fiber conductor, thus crushing the optical fibers in the interior, or the rollers used in the post-forming step produce a tensile force which can break the optical fibers in the interior.

SUMMARY OF THE INVENTION

According to the aforesaid "untwisted" type of stranding, the problem due to residual stresses in the "non-untwisted" type, is at least eliminated. Thus, for stranding profile strands, it is preferable to use this "untwisted" type of stranding.

Accordingly, an object of this invention is to provide a method of stranding profile strands together which is capable of performing the "untwisted" type of stranding.

Another object of the invention is to provide an apparatus for stranding profile strands together, which is capable of advantageously performing the aforesaid stranding method.

The stranding method of this invention is a method of stranding a plurality of profile strands together around a central wire material. This method comprises the steps of imparting a spiral twist to each profile strand, removing the strains of said twisted profile strands, and stranding said twisted strands together around a central wire material thereby using the "untwisted" type of stranding. The spiral twist applied in advance to the profile strands is connected with the configuration which each strand assumes after the strands have been stranded together.

The "untwisted" type of stranding is performed by causing the profile strands to execute a planetary motion relative to the central wire material around the latter. Such stranding can be performed by two methods. In a first method the profile strands are caused to move in a planetary motion around the central wire material without rotating the latter. In a second method the central wire material is rotated around its axis while the profile strands are rotated around their axes with the positions of the axes of the profile strands being substantially fixed. In performing the first method, the "planetary type stranding machine" is advantageously used, while the "take-up rotary type stranding machine having an untwisting function" is advantageously used in performing the second method.

The stranding apparatus of this invention comprises at least the following components: a device for producing profile strands which have been given a spiral twist, a plurality of bobbins which each holding thereon the twisted profile strand as wound thereon, central wire material feeding means for feeding a central wire material in the direction of its axis, an eyeplate through which the profile strands drawn off the bobbins are passed, a collector die for collecting and stranding together the strands drawn out of the bobbins around the central wire material, means which, while causing the bobbins to execute planetary motion relative to the central wire material, provides relative rotation around the axis of the central wire material between a first group comprising the bobbins and eyeplate and a second group comprising the central wire material and collector die, and means for restraining the inclined attitudes of the profile strands on their cross-sections at least in one location between the bobbins and the collector die. Particularly the last-mentioned component is noteworthy, ensuring that each profile strand is controlled at the stranding site so that it always assumes the proper inclined attitude.

According to the method of this invention, even if the strands are profile strand, it is possible to perform stranding of the so-called "untwisted" type such as the planetary type and therefore there is no possibility of stresses remaining in the strands. Thus, all the required qualities for stranded wires, i.e., freedom from the "loosening" of the strands, freedom from rotation of the entire stranded wire and freedom from "undulation" of the stranded wire, can be attained. Preferably, the residual stresses in the twisted strands are removed before they are stranded together. Thus, since the step of removing the residual stresses in the strands after stranding together, is unnecessary, what is mechanically weak, such as an optical fiber conductor, can be used as a central wire material without any problem. Therefore, the stranding method of this invention has wide uses.

According to the stranding apparatus of this invention, profile strands can be efficiently stranded together. Particularly, the means for restraining the inclined attitudes of the profile strands on their cross-sections enables the inclined attitudes of the profile strands at the stranding site to be properly maintained at all times and even if the pitch of the pre-twist becomes incorrect, the stranding together of the strands can be continued under good conditions.

These objects and other objects, features, aspects and advantages of the present invention will become more apparent from the following detailed description of the present invention when taken in conjunction with the accompanying drawings.

DESCRIPTION OF PREFERRED EMBODIMENTS AND OF THE BEST MODE OF THE INVENTION

Figure 1:
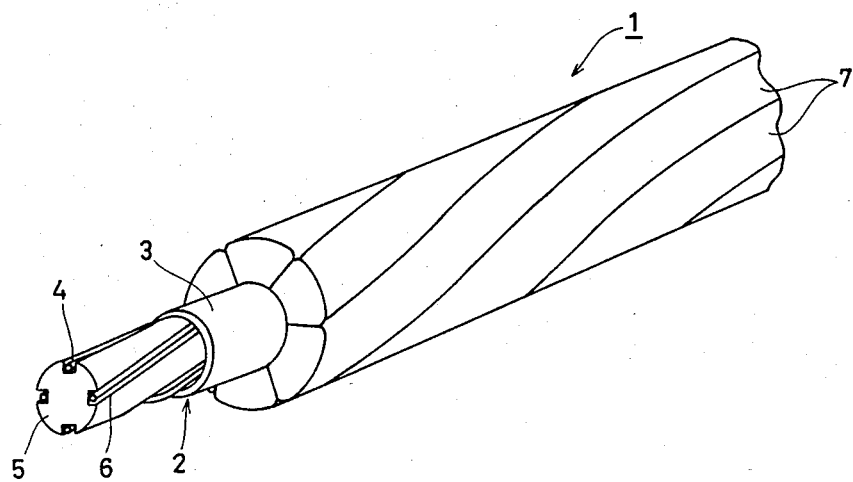
FIG. 1 is a fragmentary perspective view showing an optical composite aerial ground wire as an example of a stranded wire obtained by this invention.

FIG. 1 is a fragmentary perspective view showing an optical composite aerial ground wire or cable 1 made by an embodiment of this invention. The optical composite aerial ground wire 1 comprises an optical fiber conductor 2 including a plurality of individual optical fibers 4 held in grooves 6 of a fiber carrier core 5 surrounded by a a circular pipe 3 of aluminum or an aluminum alloy.

The grooves 6 in which the optical fibers 4 are received, extend spirally in the peripheral surface of the core 5 of, e.g., aluminum. Six profile strands 7 of substantially sectorial cross-section are stranded together on the outer surface of the pipe 3. The profile strands 7 are formed of steel wires or aluminum-covered steel wires, and when their tensile strength is not less than 60 kg/mm², the significance of this invention becomes remarkable. The profile strands 7 form a substantially cylindrical stranded wire layer on the outer peripheral surface of the optical fiber cable 2.

Figure 2:
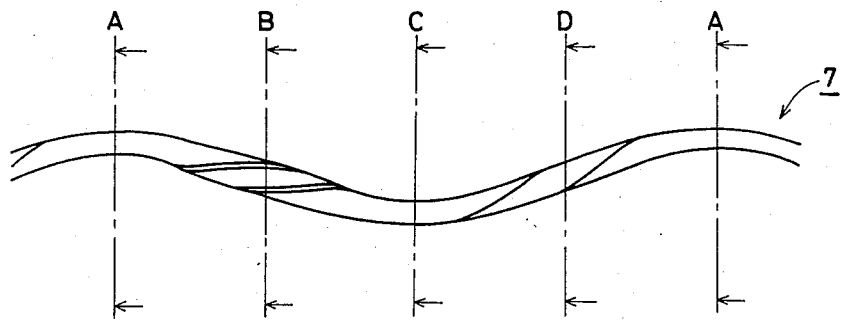
FIG. 2 is a front view singly showing only one of the profile strands shown in FIG. 1.

FIG. 2 is a front view showing one of the profile strands 7 shown in FIG. 1. The profile strand 7 has been given spiral twist. The cross-sectional shape of this profile strand 7 taken at different positions is shown collectively in FIG. 3.

Figure 3:
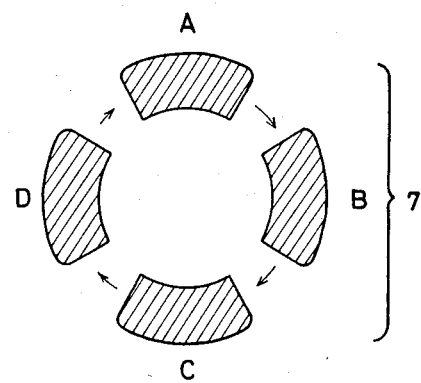
FIG. 3 shows the cross-section of the profile strand taken at different positions shown in FIG. 2.

In FIG. 3, the sectorial cross-sections shown at A–D correspond to the cross-sections taken along the lines A–D of FIG. 2. As shown by arrows in FIG. 3, the cross-section changes as indicated at A, B, C, D, A and so on. In performing the method of this invention, first, profile strands 7 having the shape shown in FIG. 2 are prepared. This will be described below by successively referring to FIGS. 4 and 5.

Figure 4:
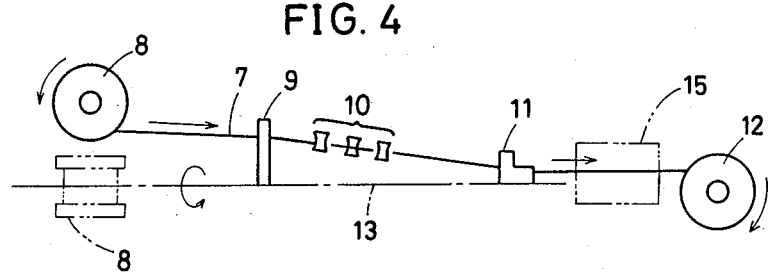
FIG. 4 diagrammatically shows the step of imparting spiral twist to the profile strand.

FIG. 4 is a view for explaining the step of imparting twist to the profile strand 7. In FIG. 4, a conventional rigid type stranding machine which performs the so-called "non-untwisted" type stranding or twisting is shown. The profile strand 7 has been wound in the usual manner on a bobbin 8 on the supply side. The profile strand 7 drawn off the bobbin 8 is first passed through an eyeplate 9, and by preforming rollers 10, it is passed through a collector die 11 and wound on a bobbin 12 on the take-up side. The bobbin 8, eyeplate 9 and preforming rollers 10 are synchronously rotated around the centerline 13. Therefore, the twist pitch for the profile strand 7 to be wound on the bobbin 12 can be optionally selected by adjusting the length of the profile strand 7 to be wound per unit time on the bobbin 12 on the take-up side, and the number of revolutions per unit time around the centerline 13. In addition, another bobbin 8 on the supply side is shown in phantom lines in FIG. 4; this is for the purpose of making a clear distinction between this type of stranding and the "untwisted" type of stranding to be described below. During withdrawal of the profile strand 7, the bobbin 8 makes one revolution around its own axis (own-axis revolution) while making one revolution around the centerline 13 (orbital revolution) as in the case of the relative motion between the earth and the moon.

In addition, the movements of the components in the aforesaid motion system are relative, and a "take-up rotary type stranding machine having no untwisting function" may be used in place of the "rigid type stranding machine". In this case, in FIG. 4, the bobbin 8 on the supply side will not rotate around the centerline 13 and, reversely, the bobbin 12 on the take-up side will rotate around the centerline 13.

Figure 5:
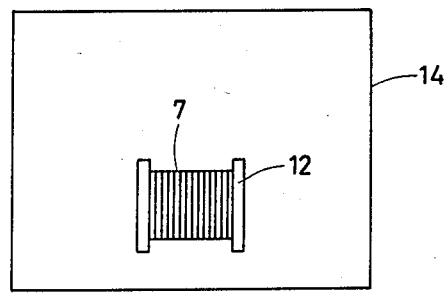
FIG. 5 diagrammatically shows the step of heat-treating the twisted profile strand.

As shown in FIG. 5, the bobbin 12 having the twisted profile strand 7 wound thereon is then heat-treated in, e.g., a batch furnace 14. This heat treatment is performed to remove the residual stresses in the twisted profile strands 7 and has only to be effective in at least removing the strains in the material of the profile strands 7. If, however, this heat treatment condition is too severe, an excessive annealing effect would be produced on the material of the profile strand 7, decreasing the strength to a great extent. Therefore, preferable conditions for heat treating the profile strands 7 of steel or aluminum coated steel are, a temperature within the range of 200°–500° C. and a duration of about 30 minutes of heat treatment. If the temperature is less than 200° C., the strains in the profile strand 7 could not be removed, while, reversely, if it exceeds 500° C., the strength of the profile strand 7 would be decreased.

As for the heat-treating method, besides using the batch furnace 14 shown in FIG. 5, a heat-treating device 15 may be placed at a position shown in phantom lines in FIG. 4 for the heat treatment in a so-called in-line manner. The heat-treating furnace 15 used herein may be a high frequency induction heating device or a tunnel furnace. In addition, in the batch type shown in FIG. 5, a high frequency induction heating device may be used. Further, Joule heat may be used as heating means by passing a current directly through the profile strand 7.

Figure 6:
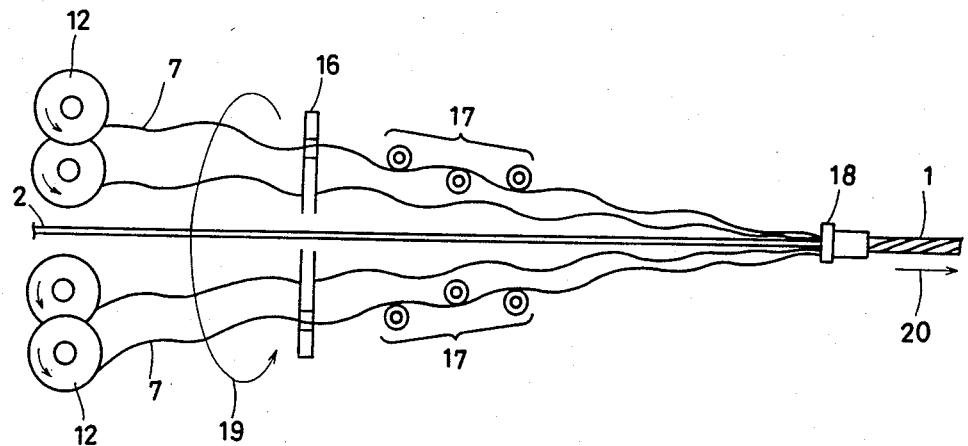
FIG. 6 diagrammatically shows the step of stranding together the twisted and strain-removed profile strands.

Subsequently, as shown in FIG. 6, a plurality of twisted and strain-removed profile strands 7 forming unstressed strands are used to form a stranded wire layer on the optical fiber conductor 2 which serves as the central wire material. This step is performed by e.g., a planetary type stranding machine which performs the "untwisted" type of stranding, and FIG. 6 shows an example in which the stranding is performed by a planetary type stranding machine. Thus, six bobbins 12 each have a twisted and strain-removed profile strand 7 wound thereon are prepared, said bobbins 12 being mounted on a bobbin orbital-rotation device (not shown). In FIG. 6, the two bobbins 12 on the front side are omitted from the illustration, but all the bobbins have their axial directions maintained substantially fixed by the bobbin orbital-rotation device while executing a planetary motion around the optical fiber conductor 2. That is, the bobbins 12 only perform an orbital rotation without any rotation around their own axis, just as the seats of a Ferris wheel are rotated with the rotation of the wheel. This is a feature of the "untwisted" type. The profile strands 7 withdrawn from the bobbins 12 are passed through the eyeplate 16 and while they are being guided by the preforming rollers 17, they are collected in the collector die 18. The preforming rollers 17 grouped in, e.g., three rollers, and the distance between the first and the third rollers is selected so that it is equal to the twist or strand pitch of the stranded wire or cable to be obtained.

In synchronism with the planetary motion of the bobbins 12, the eyeplate 16 and preforming rollers 17 are rotated or caused to make follow an orbital rotation (in the direction of arrow 19) while the optical fiber conductor 2 which serves as the central wire material, is fed in the direction of arrow 20. In addition, the device for feeding the optical fiber conductor 2, though not shown, includes a capstan directed as indicated by arrow 20 and a take-up drum.

In addition, the movements of the components included in the aforesaid motion system are relative, and the planetary type stranding machine may be replaced by a "tape-up rotary type stranding machine having an untwisting function". In this case, the collector die 18, capstan and take-up drum (winder) are rotated in the direction of arrow 19 while the bobbins 12, eyeplate 16 and preforming rollers 17 are not rotated in the direction of arrow 19 but are stationary, and the optical fiber conductor 2 which serves as the central wire material is rotating in the direction of arrow 19. Further, to provide the untwisting function, rotation is imparted to each bobbin 12 so that it rotates the profile strand 7 in a direction at right angles to the direction of withdrawal of the profile strand 7, i.e., around its axis.

When rotation in the direction of arrow 19 is imparted to each profile strand 7 while the optical fiber unit 2 is being fed in the direction of arrow 20, as described above, at the position of the collector die 18 the profile strands 7 are stranded together; thus, the desired wire stranding is performed.

When the aforesaid wire stranding step is being performed for a long time (i.e., over a long distance), any error between the twist pitch of the profile strands 7 and the twist or strand pitch of the stranded wire builds up, so that the inclined attitudes of the profile strands on their cross-sections at the stranding site sometimes go out of the desired condition. Thus, it is preferable to take measures against this phenomenon by providing means for restraining the inclined attitudes of the profile strands 7 on their cross-sections at least at one location between the bobbin 12 and the collector die 18. Some examples of such means will be described below.

Figure 7:
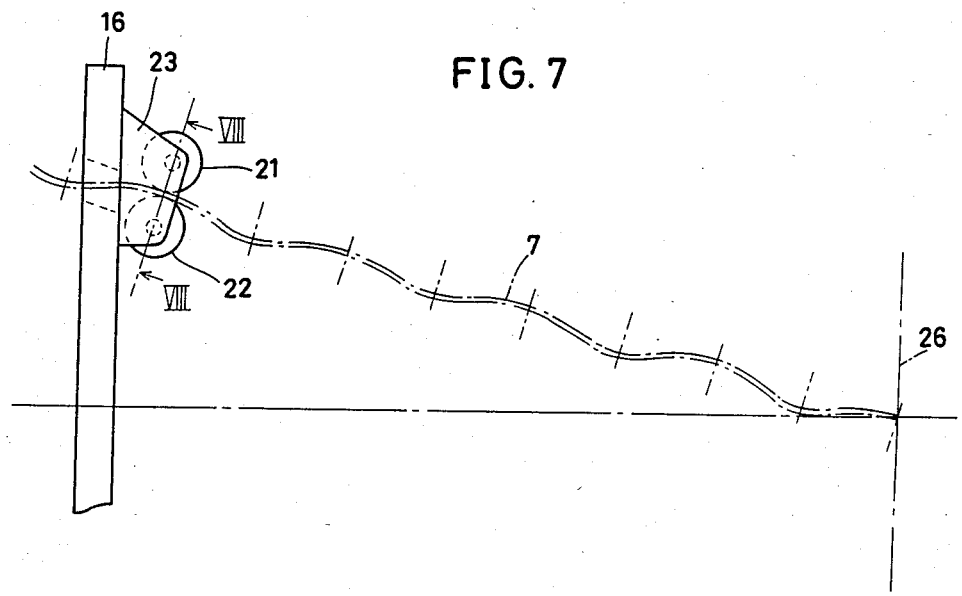
FIG. 7 shows a first example of means for restraining the inclined attitude of the profile strand.
Figure 8:
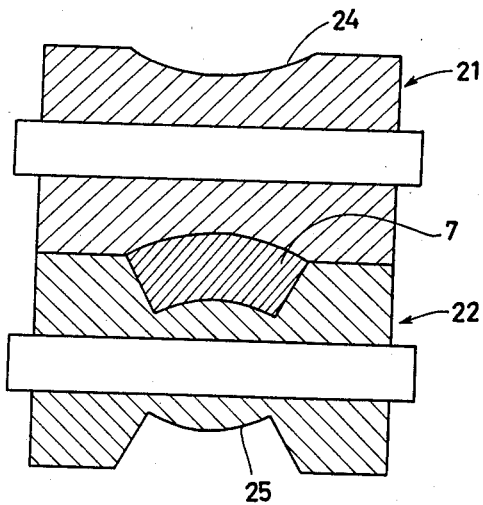
FIG. 8 is an enlarged sectional view taken along the line VII—VII of FIG. 7.

FIG. 7 shows a first example of means for restraining the inclined attitudes of the profile strands. In FIG. 7, a pair of rollers 21 and 22 is rotatably attached to the eyeplate 16 through a bracket 23. As is clear from FIG. 8 showing an enlarged cross-section taken along the line VII—VII of FIG. 7, the peripheral surfaces of the rollers 21 and 22 are formed with a pair of grooves 24 and 25 having cross-sections which, when combined, correspond to the cross-section of the profile strand 7. Thus, when the profile strand 7 passes through these rollers 21 and 22, its attitude on its cross-section is automatically restrained. If the configuration of the twisted profile strand 7 is modeled on a sine curve, the stranding location 26 must be positioned at a crest of the sine curve. In the illustrated example, the rollers 21 and 22 are also located at a crest of the sine curve. Therefore, the position where the rollers 21 and 22 are installed is such that the distance from the rollers 21 and 22 to the stranding location 26 is an integral multiple of the period of the sine curve. In addition, FIG. 7 shows one profile strand 7, but the same arrangement is also applied to the other profile strands.

Figure 9:
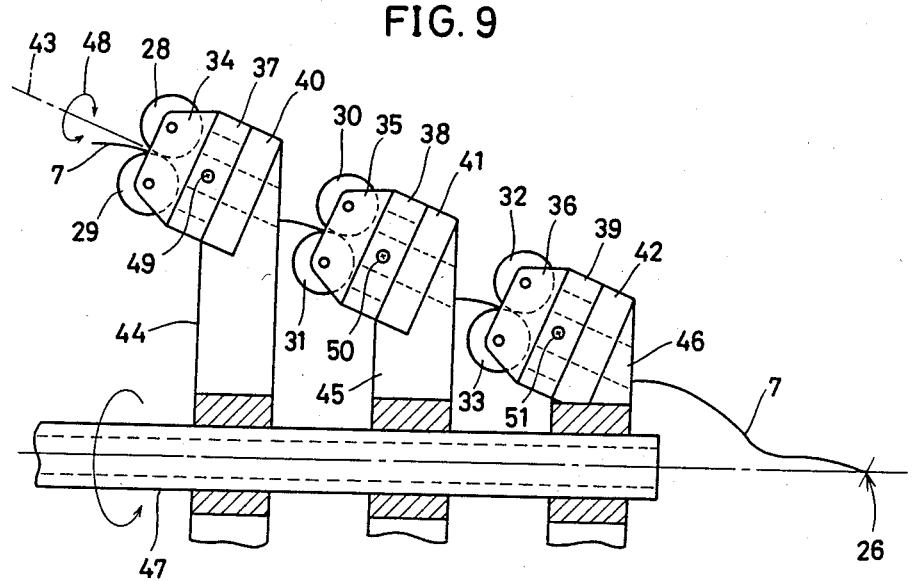
FIG. 9 shows a second example of means for restraining the inclined attitude of the profile strand.

FIG. 9 shows a second example of the means for restraining the inclined attitudes of profile strands. The illustrated arrangement is positioned at the place where the preform rollers 17 of FIG. 6 were located. In this example, three pairs of rollers 28-33 are installed and rotatably held by brackets 34-36. The brackets 34-36 are respectively fixed to turntables 37-39. The turntables 37-39 are respectively held by holder blocks 40-42 so that they are rotatable around an axis 43. The holder blocks 40-42 are fixed to a pipe 47 respectively through arms 44-46. The pipe 47 rotates integrally with the eyeplate 16 and allows the optical fiber conductor 2 to pass through the interior thereof.

As described above, the turntables 37-39 are attached so that they are rotatable around the axis 43. Therefore, the pairs of rollers 28-33 can be rotated in the direction of arrow 48 to change their directions. By tightening up screws 49-51, the inclinations of the rollers 28-33 are fixed. In addition, the shape of the rollers 28-33 is not specifically illustrated but they have grooves similar to those of the aforesaid rollers 21 and 22.

In FIG. 9, when the configuration of the profile strand 7 is regarded as a sine curve, the pairs of rollers 28-33 are shown located at positions corresponding to crests of the sine curve. In this example, however, even if the rollers are not positioned at crests, the inclined attitude of the profile strand 7 on its cross-section can be restrained.

Figure 10:
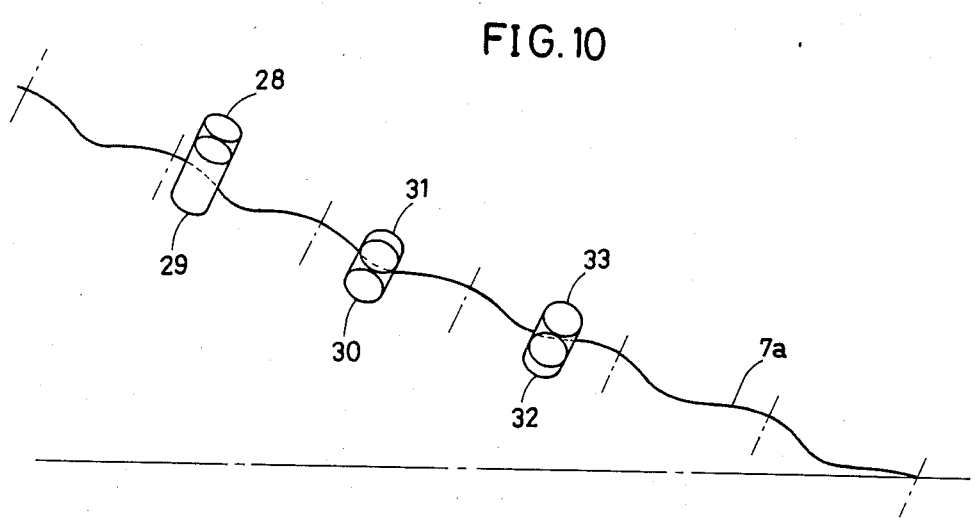
FIG. 10 shows a manner in which rollers of FIG. 9 are adjusted.

FIG. 10 shows a case where a profile strand 7a whose twist pitch differs is used. In this case, the positions where the rollers 28-33 are located may deviate from crests of the sine curve, as described above. The positions of the rollers 28-33 shown in FIG. 10 all deviate from crests of the profile strand 7a. In this case, the screws 49-51 are loosened and the rollers 28-33 are rotated around the axis 43 until desired inclinations are obtained, whereupon the screws 49-51 are tightened again to fix the inclinations. Such arrangement is advantageous in cases where it is necessary to produce stranded wires of different pitches by a single stranding machine.

If such advantage is not desired, the rollers 28-33 may be installed with their inclinations fixed. Further, the arrangement for adjusting the inclinations of the rollers is also applicable to the rollers 21 and 22 of FIG. 7 described above.

Figure 11:
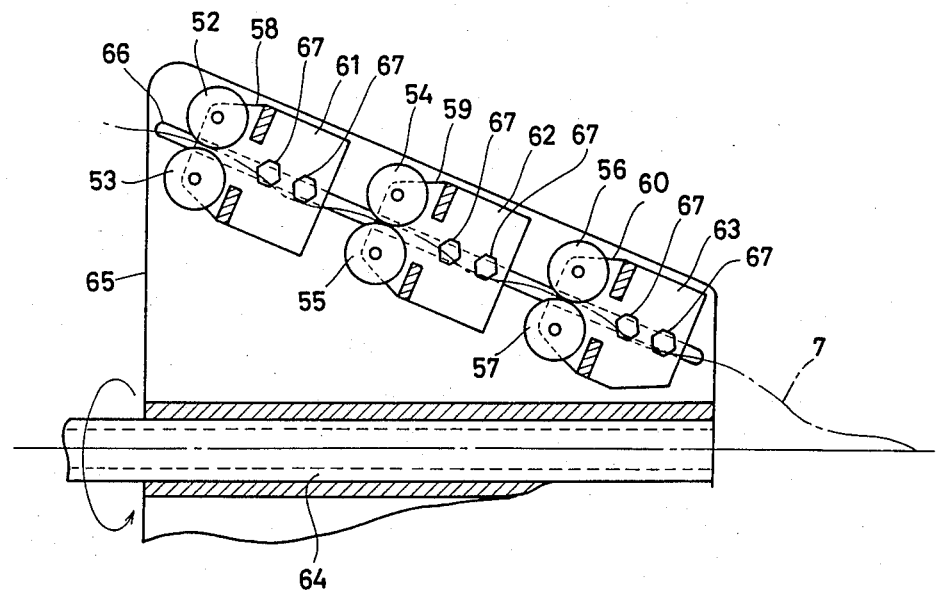
FIG. 11 shows a third example of means for restraining the inclined attitude of the profile strand.

FIG. 11 shows a third example of the means for restraining the inclination of the profile strand 7 on its cross-section. In this example, the same considerations as in the second example apply. First, as in the second example, three pairs of rollers 52-57 are rotatably held by brackets 58-60. Attaching blocks 61-63 extend integrally from the brackets 58-63, respectively. On the other hand, an attaching plate 65 extends radially from the pipe 64 adapted to be rotated integrally with the eyeplate 16. The attaching plate 65 is formed with an elongated opening 66 extending parallel to the axis of the profile strand 7. To attach the rollers 52-57 to the attaching plate 65, a plurality of bolts 67 are prepared, said bolts extending through the attached blocks 61-63 and elongated opening 66 and threadedly engaged with nuts (not shown) on the back side of the attaching plate 65.

In the example shown in FIG. 11, the inclinations of the rollers 52-57 are fixed, but their positions along the length of the profile strand 7 are adjustable. That is, when the bolts 67 are loosened, the attaching blocks 61-63 are allowed to move along the elongated opening 66, and by tightening the bolts 67 again, the attaching blocks can be fixed in position. Therefore, the rollers 52-57 can be adjusted so that they are positioned at, e.g., crests of the profile strand 7.

In FIGS. 9 and 11, the illustration has been made with reference to only one profile strand, but the same arrangement is added for the other profile strands, as in the case of FIG. 7. That is, in the example shown in FIG. 9, six sets of arms 44-46 extend radially of the pipe 47, while in the example shown in FIG. 11, six attaching plates 65 extend radially around the pipe 64.

The means for restraining the inclinations of the profile strands 7 on their cross-sections respectively described with reference to FIGS. 7-11, may be provided in combination for a single stranding machine.

Figure 12:
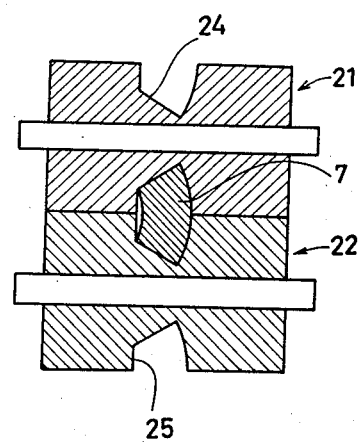
FIG. 12 shows modifications of rollers.

FIG. 12 shows a modification of the rollers 21 and 22 shown in FIG. 7. As shown, the cross-sectional shape of the grooves 24 and 25 formed in the rollers 21 and 22 can be suitably changed. Herein, a profile strand 7 of sectorial cross-sectional shape is restrained in its vertical attitude. In short, the grooves formed in the rollers 21 and 22 should be such that when combined, they define a cross-section corresponding to that of the profile strand 7.

In addition, the modification shown in FIG. 12 is also applicable to the rollers 28–33 shown in FIG. 9 and to the rollers 52–57 shown in FIG. 11.

Figure 13:
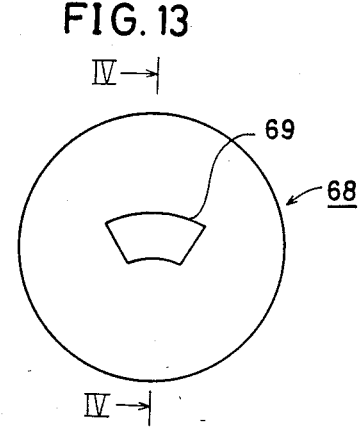
FIG. 13 is a front view of a die shown as another example of the inclined attitude restraining means.
Figure 14:
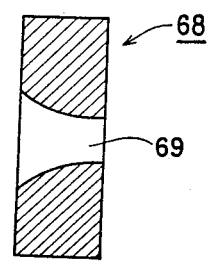
FIG. 14 is a sectional view taken along the line IV—IV of FIG. 13.

The means for restraining the inclined attitudes of the profile strands on their cross-sections need not be rollers in pairs. For example, a die 68 shown in FIGS. 13 and 14 may be used. FIG. 13 shows a front view of the die 68 and FIG. 14 shows a sectional view taken along the line IV—IV of FIG. 13. The die 68 is formed with a hole 69 corresponding in cross-section to the profile strand 7. Such die 68 may be used in the place of the rollers 21–22 in FIG. 7, the rollers 28–33 in FIG. 9 and the rollers 52–57 in FIG. 11

Figure 15:
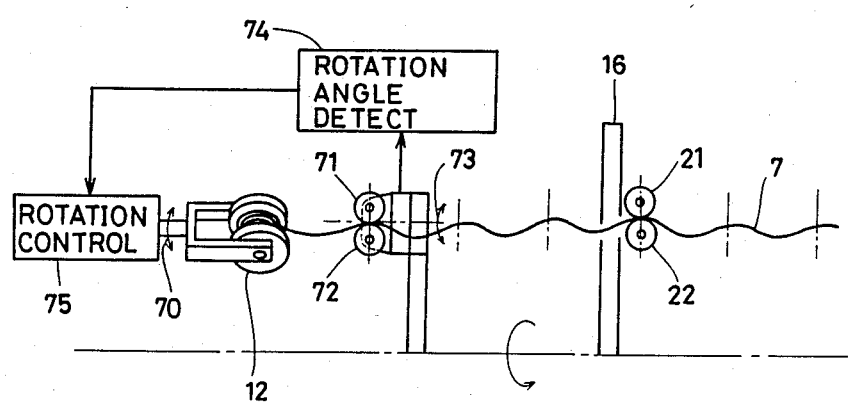
FIG. 15 diagrammatically shows a mechanism for controlling the inclination of a bobbin.

FIG. 15 shows an arrangement for carrying out the method of this invention. In FIG. 6, the bobbins 12 have been shown as having their axes maintained in the same direction during a planetary motion, but preferably the bobbin 12, as shown in FIG. 15, is constructed so that its inclination can be changed during a planetary motion, as indicated by arrow 70. In FIG. 15, the rollers 21 and 22 of FIG. 7 are shown. If the inclined attitude of the profile strand 7 on its cross-section is to be restrained by such rollers 21 and 22, an excessive force can be produced in the twist direction on the profile strand 7 present between the bobbin 12 and the rollers 21, 22. The arrangement shown in FIG. 15 is such that any excessive force minimized. That is, a pair of rollers 71 and 72 are disposed between the bobbin 12 and the rollers 21, 22 are adapted to be tilted in the directions indicated by arrow 73. The rollers 71 and 72 are formed with grooves 24 and 25 shown in FIG. 8 as in the case of the rollers 21 and 22. The angle of rotation of the rollers 71 and 72 in the directions of arrow 73 is also restrained through the profile strand 7 whose inclined attitude is restrained by the rollers 21 and 22. This angle of rotation is detected by a rotation angle detecting device 74, the output of which is given to a rotation control device 75. The rotation control device 75 controls the bobbin 12 so that it assumes a desired inclination according to the angle of rotation of the rollers 71 and 72. That is, according to the arrangement of FIG. 15, since the inclination of the bobbin 12 is controlled so that the rollers 71 and 72 assume the same inclinations as those of the rollers 21 and 22, there is produced almost no excessive force in the twist direction on the profile strand 7 between the bobbin 12 and the rollers 21, 22.

The results of experiments conducted to ascertain the effect of this invention will now be described. First, as the most preferable example which is within the scope of this invention, after twist was imparted to profile strands, the latter were heat-treated at 320° C. to remove their strains, whereupon they were stranded together by a planetary type stranding machine while performing the restraint shown in FIG. 9, whereby a very good strand or twist condition was obtained over a long distance.

In contrast thereto, when said profile strands were stranded together without performing the restraint shown in FIG. 9, a good strand or twist condition was maintained over 500 m.

However, when profile strands each of which was twisted but was not heat-treated for removal of the strains, were used, it was found that even if the restraint shown in FIG. 9 was applied to the profile strands, the resulting stranded wire had a poor performance, having an increased tendency of rotation of the entire stranded wire.

Further, when profile strands were stranded together by the "non-untwisted" type, the resulting stranded wire had an increased tendency of rotation of the entire stranded wire and its performance was worse.

In addition, profile strands to be used in this invention are not limited to those obtained through said process, and they may be obtained by the following process.

Figure 16:
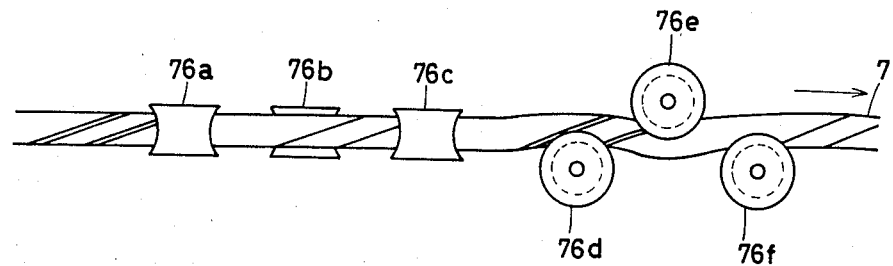
FIG. 16 diagrammatically shows another example of the step of removing strains in the profile strand.

In the embodiments described above, the heat treatment has been performed to remove the strains in the profile strands having a spiral twist, but as shown in FIG. 16 the profile strand 7 may be subjected to the action of a plurality of rollers 76a–76f. Such plurality of rollers 76a–76f correspond to the aforesaid post-forming rollers, but the post-forming step in this case is applied only to the profile strand 7 and it is possible to impose a considerably severe condition, enabling a sufficient strain removal.

Figure 17:
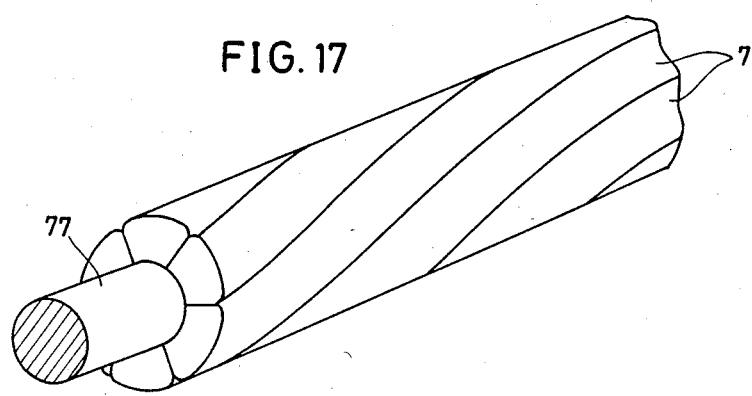
FIGS. 17 and 18 are views for explaining still another step of obtaining a spirally twisted and strain-removed profile strand.
Figure 18:
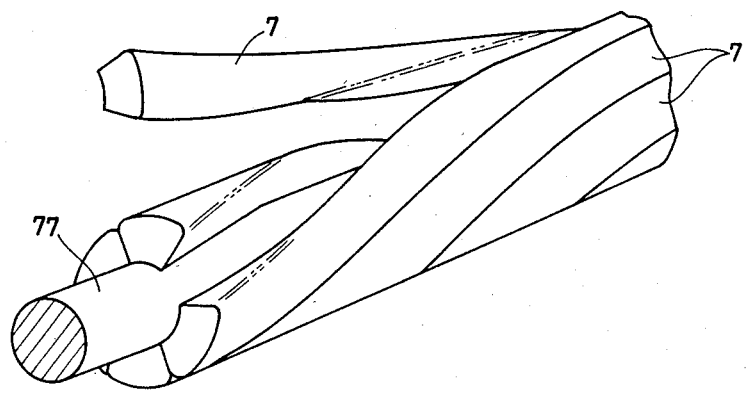

As shown in FIG. 17, a so-called "dummy" strand core 77 may be used to strand a plurality of profile strands 7 together around said core by the "non-untwisted" type. After the strains in the profile strand 7 are removed by heat treatment or by using the rollers shown in FIG. 16, the profile strands 7 are separated one by one as shown in FIG. 18 and they may be supplied from the bobbins 12 shown in FIG. 6.

So far, the invention has been described in detail on the basis of embodiments thereof illustrated with respect to the case of obtaining optical composite aerial ground wires, but the invention is likewise applicable to transmission lines and to ropes.

In the illustrated embodiments, the cross-sectional shape of profile strands has been shown as a sector, but the invention is not limited thereto and can be advantageously applied provided that the strands are other than circular in cross-section.

Although the present invention has been described and illustrated in detail, it is clearly understood that the same is by way of illustration and example only and is not to be taken by way of limitation, the scope of the present invention being limited only by the terms of the appended claims.

What is claimed is:

1. A method for stranding a plurality of profile strands (7) together around a central wire means having a central axis (2), comprising the steps of: first imparting a spiral twist having a given twist pitch to each of said plurality of profile strands (7) whereby a certain stress is introduced into each profile strand, then subjecting said strands to a heat treatment within a temperature range and for a time duration sufficient for again removing said stress from said twisted profile strands for providing twisted but unstressed strands, and then subjecting said twisted and unstressed strands to a planetary motion with respect to said central axis for stranding said plurality of twisted and unstressed profile strands around said central wire means thereby using a stranding twist pitch which is substantially the same as said given twist pitch.

2. The method of claim 1, wherein the step of imparting spiral twist to each of said profile strands (7) is performed by using a rigid type stranding machine.

3. The method of claim 1, wherein the step of imparting spiral twist to each of said profile strands (7) is performed by using a take-up rotary type stranding machine not having a untwisting function.

4. The method of claim 1, comprising using steel wires having a tensile strength of at least 60 kg/mm$^2$ for forming said twisted profile strands.

5. The method of claim 4, wherein said steel wires are aluminum-covered steel wires.

6. The method of claim 5, wherein said heat treatment step for removing said stress from the twisted profile strands is performed within a temperature range of 200°-500° C.

7. The method of claim 1, wherein said stranding step is performed by causing said twisted and unstressed profile strands (7) to execute a planetary motion around said central axis of said central wire means without rotating said central wire means.

8. The method of claim 7, wherein said stranding step is performed by using a planetary type stranding machine.

9. The method of claim 1, wherein said stranding step is performed by rotating said central wire means around its central axis while rotating the profile strands (7) around respective strand axes having substantially fixed positions.

10. The method of claim 9, wherein said stranding step is performed by using a take-up rotary type stranding machine having an untwisting function.

11. The method of claim 1, comprising using as said central wire means an optical fiber conductor means.

12. The method of claim 1, wherein the cross-sectional shape of said profile strands (7) is substantially sectorial.

13. The method of claim 1, wherein said heat treatment is performed with said twisted profile strand (7) wound on a bobbin.

14. The method of claim 1, wherein said heat treatment is performed before said twisted profile strand (7) is wound on a bobbin.

15. An apparatus for stranding profile strands, comprising: a device for producing profile strands which having a spiral twist with a given twist pitch, a plurality of bobbins (12) each holding thereon said twisted profile strand (7) as wound thereon, central core feeding means for feeding a central core in a predetermined direction forming a central axis of said core, an eyeplate (16) forming a guide through which a plurality of profile strands (7) drawn out of said bobbins, are passed, a collector die (18) for collecting and stranding together the plurality of profile strands (7) drawn out of said bobbins (12) around said central core, relative rotation means for causing the plurality of bobbins (12) to execute a planetary motion relative to said central core and for providing relative rotation around said central axis between a first group including the plurality of bobbins (12) and said eyeplate (16), and a second group including said central core and said collector die (18), and restraining means 17, 21, 22, 28-33, 68, 52-57) for restraining the inclined attitudes of said profile strands on their cross-sections at least at one location between said bobbins (12) and said collector die (18).

16. The apparatus of claim 15, wherein said relative rotation means causes said plurality of bobbins (12) to execute a planetary motion around said central core while maintaining their axial directions unchanged without rotating said central core and said collector die (18), while rotating said eyeplate (16) around said central axis of said central core synchronously with the planetary motion of said bobbins (12).

17. The apparatus of claim 15, wherein said relative rotation means rotate said central core and said collector die (18) around said central axis of said central core while holding said bobbins (12) and said eyeplate (16) in fixed positions, and while rotating said bobbins (12) so that said profile strands rotate around their respective axes.

18. The apparatus of claim 15, wherein said inclined attitude restraining means comprise rollers (21, 22) forming a pair, the peripheral surfaces of said rollers (21, 22) having grooves (24, 25) with cross-sections which, when combined, correspond to the cross-section of the profile strands (7).

19. The apparatus of claim 15, wherein said inclined attitude restraining means comprises a die (68) having a hole (69) corresponding to the cross-section of the profile strands (7).

20. The apparatus of claim 15, wherein said inclined attitude restraining means (28-33, 52-57) are installed at a plurality of locations along the direction of the length of each profile strand (7).

21. The apparatus of claim 15, wherein said inclined attitude restraining means (28-33) are arranged so that an angle of rotation around a centerline of the profile strand (7) is adjustable.

22. The apparatus of claim 19, wherein said inclined attitude restraining means (52-57) are arranged so that the position in the direction of the length of the profile strand (7) is adjustable.

23. The apparatus of claim 18, wherein said inclined attitude restraining means (21, 22) are attached to said eyeplate (16).

24. The apparatus of claim 18, wherein said inclined attitude restraining means (28-33, 52-57) are positioned between said eyeplate (16) and said collector die (18) and are caused to execute an orbital rotation relative to said central core synchronously with the relative planetary motion of said bobbins (12).

25. The apparatus of claim 15, wherein said profile strand producing device comprises a rigid type stranding machine for imparting a spiral twist to said profile strand (7), and a stress removing device (14, 15, 76a-76f) for removing any stress from the twisted profile strand (7).

26. The apparatus of claim 25, wherein said strain removing device includes a heat treating device (14, 15).

27. The apparatus of claim 25, wherein said strain removing device includes a plurality of rollers (76a-76f) acting on the twisted profile strand (7).

28. The apparatus of claim 15, including detecting means (74) disposed between said bobbin (12) and said eyeplate (16) for detecting the inclined attitude of the profile strand (7) in its cross-section and for producing a respective control output signal, means (75) responsive to said control output signal for controlling the inclination of said bobbins (12) with respect to said central core whereby an excessive force in the twist direction is prevented from being effective on the profile strand (7) being drawn out of said bobbin (12).

29. A method for stranding a plurality of profile strands together around a central wire means having a central axis, comprising the steps of: first imparting a spiral twist having a given twist pitch to each of said plurality of profile strands (7) whereby a certain stress is introduced into each profile strand, then subjecting said strands to a mechanical roller treatment for again removing said stress from said twisted profile strands for providing twisted but unstressed strands, and then subjecting said twisted and unstressed strands to a planetary motion with respect to said central axis for stranding said plurality of twisted and unstressed profile strands around said central wire means thereby using a stranding twist pitch which is substantially the same as said given twist pitch.

* * * * *